Figure 3:
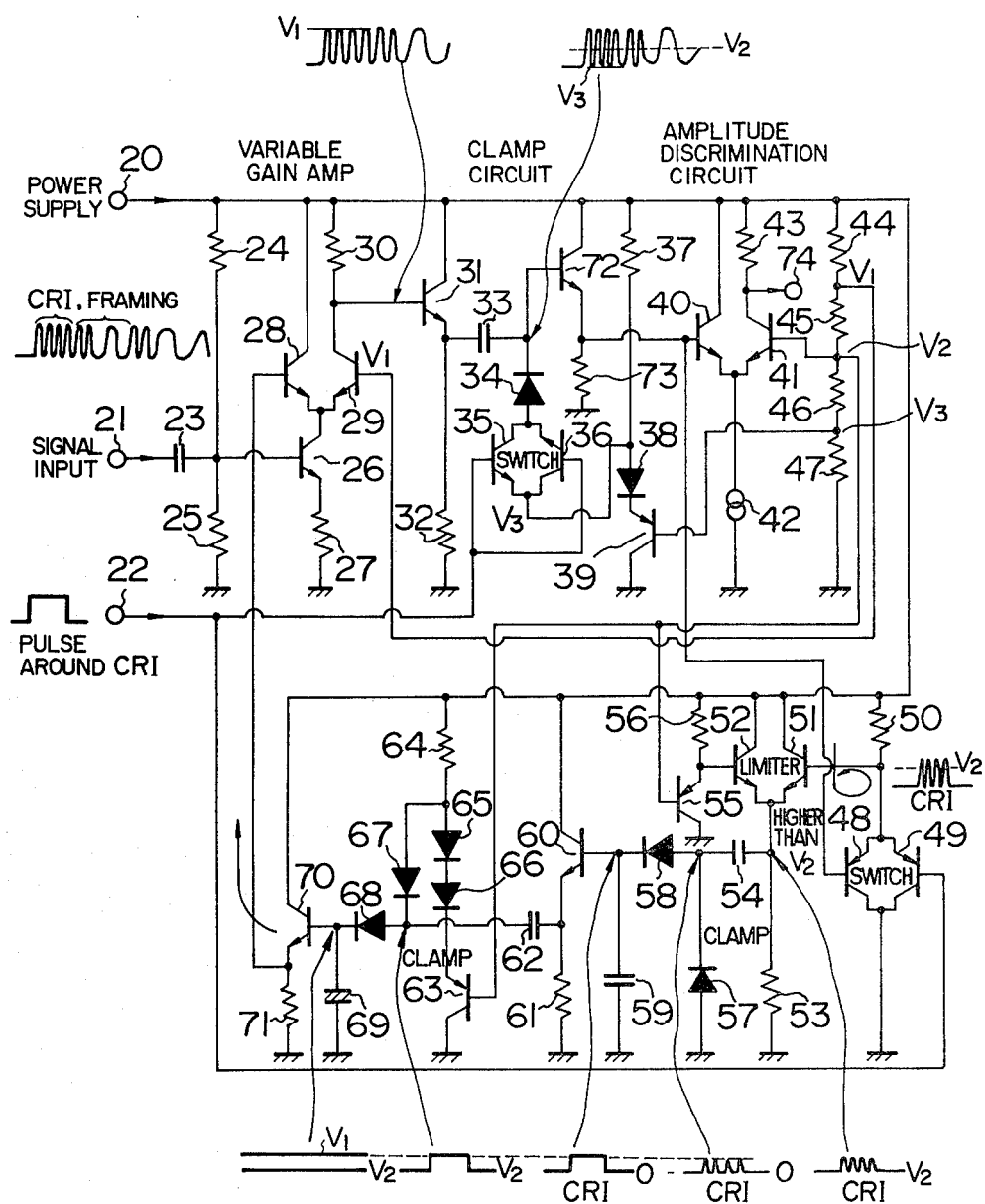

United States Patent [19]

Fukuda et al.

[11] 4,318,127
[45] Mar. 2, 1982

[54] MULTIPLEXED TELEVISION SIGNAL PROCESSING SYSTEM

[75] Inventors: Shin Fukuda, Hirakata; Masayoshi Hirashima, Ibaraki, both of Japan

[73] Assignee: Matsushita Electric Industrial Co., Ltd., Kadoma, Japan

[21] Appl. No.: 174,620

[22] Filed: Aug. 1, 1980

[30] Foreign Application Priority Data

Aug. 13, 1979 [JP] Japan .............................. 54-103023

[51] Int. Cl.³ .............................................. H04N 7/00
[52] U.S. Cl. ................................................... 358/147
[58] Field of Search ................................. 358/142, 147

[56] References Cited

U.S. PATENT DOCUMENTS 3,507,985  4/1970  Breukink et al. ................... 358/147

OTHER PUBLICATIONS

Wirless World, Nov. 1975, pp. 498–504.

Primary Examiner—Robert L. Richardson
Attorney, Agent, or Firm—Stevens, Davis, Miller & Mosher

[57] ABSTRACT

A signal processing system in a transmission system like Teletext System in which a binary signal is superimposed on a television signal for transmission is disclosed. When the binary signal is received, an upper (or lower) level of a pilot signal in the binary signal is clamped to a first reference voltage by a clamp circuit while the amplitude of the pilot signal is controlled by a variable gain amplifier such that the lower (or upper) level of the pilot signal becomes equal to a third reference level. The binary signal is then amplitude-discriminated using a second reference voltage as a discrimination reference. In this manner, the binary signal is correctly converted to a digital signal.

5 Claims, 4 Drawing Figures

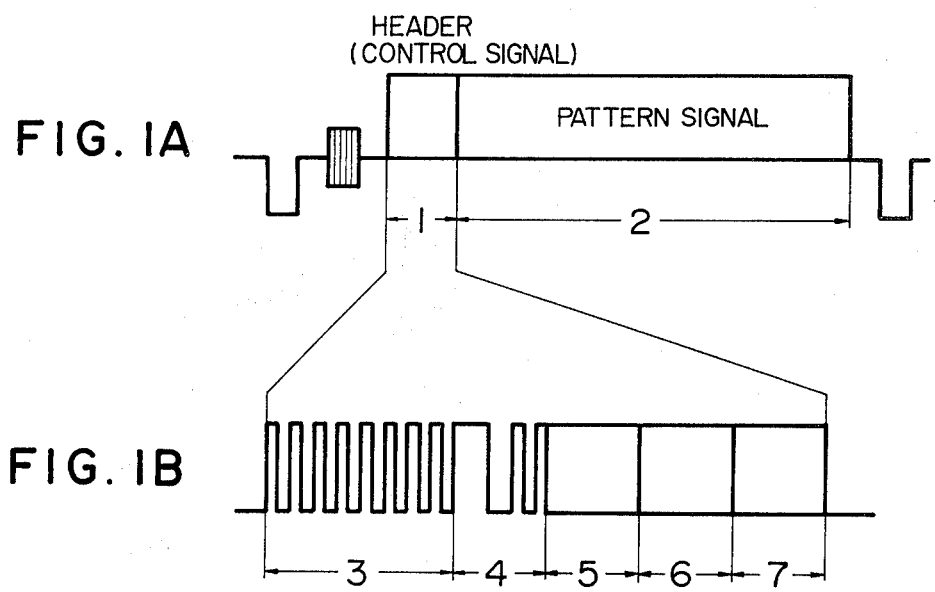
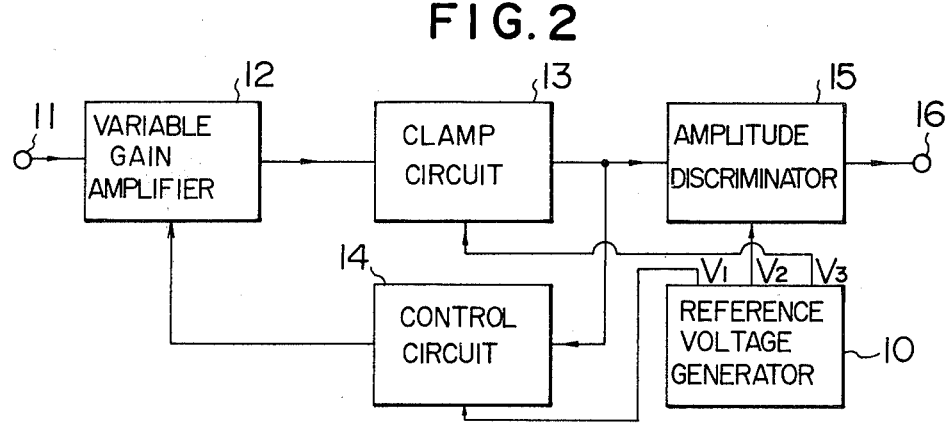

MULTIPLEXED TELEVISION SIGNAL PROCESSING SYSTEM

The present invention relates to signal processing technique for converting a received signal to a digital signal on a transmission and reception system which superimposes binary signal decomposed (or coded) character and graphic pattern during vertical retrace periods of a television signal for transmission.

Many approaches for such a system have been proposed. One of those approaches is the Japanese Teletext System in which a coded control signal and a binary decomposed pattern signal are superimposed and transmitted or received during 20th and 283th horizontal periods in a vertical retrace period. This system is first explained.

FIGS. 1A and 1B show signal waveforms of binary signals to be superimposed on a television signal, FIG. 1A shows a signal waveform of a superimposed binary signal and FIG. 1B shows an enlarged view of a control signal field called a header field of the waveform shown in FIG. 1A.

In FIGS. 1A and 1B, numeral 1 denotes the header field, numeral 2 denotes a pattern signal field which contains binary signal information data, numeral 3 denotes a 16-bit pilot signal which is called a clock run-in signal (hereinafter referred to as CRI signal), numeral 4 denotes an 8-bit framing code signal, numeral 5 denotes an 8-bit packet identification code signal, and numerals 6 and 7 denote program channel code signals.

The signals are transmitted in the format shown in FIG. 1, which signals are received by a receiver which processes the received signals to reproduce characters or graphic patterns. Those reproducing is achieved by digital process. Therefore, the superimposed binary signals must be converted to the digiral signals.

The superimposed binary signals are to be a pulse sequence of pulses of different duty factors but they are sinusoidal pulse sequence because of band restriction by a band determined by the standard television broadcasting system and the frequency characteristics of a transmitter and a receiver. As a result, in order to correctly convert them to digital signals, the superimposed binary signals must be sliced at the center voltage between the upper voltage and the lower voltage of the binary signal.

In a prior art system, a slice circuit comprises a differential amplifier having one input terminal to which a pedestal-level clamped television signal to which the binary signal is superimposed is applied, other input terminal to which a D.C. voltage which is the center level between the upper level and the lower level of the binary signal is applied, and an output terminal at which a pulse signal is produced. This signal is then level-shifted to produce the digital signal. It will be readily understood that the amplitude of the binary signal superimposed on the television signal and the lower level of the binary signal relative to the pedestal level vary by some reason or other.

When such variation occurs, the prior art signal processing system cannot correctly convert the binary signal to the digital signal, as a result, the characters or the graphic pattern cannot be correctly reproduced.

The present invention resolves the problem encountered in the prior art system by providing a reference voltage generating circuit which generates three reference voltages $V_1$, $V_2$ and $V_3$ which meet the following relationship;

$$\begin{rcases} V_1 > V_2 > V_3 \\ V_1 - V_2 = V_2 - V_3 \end{rcases} \quad (1)$$

and establishing the upper level of the transmitted binary signal at the reference voltage $V_1$ and the lower level at the reference level $V_3$, and then slicing the binary signal using the reference voltage $V_2$ as a reference level for converting it to the digital signal.

FIG. 2 shows a block diagram for illustrating a basic configuration of the present invention. In FIG. 2, numeral 10 denotes a reference voltage generating circuit for generating the three reference voltages $V_1$, $V_2$ and $V_3$, numeral 11 denotes an input terminal for a television signal on which the binary signal is superimposed, numeral 13 denotes a clamp circuit for clamping a lower level of a CRI signal, which is a pilot signal of the binary signal, at the reference voltage $V_3$, numeral 12 denotes a variable gain amplifier circuit for clamping an upper level of the CRI signal at the reference voltage $V_1$, numeral 14 denotes a control circuit for detecting the upper level of the CRI signal having its lower level clamped to the reference voltage $V_3$, comparing it with the reference voltage $V_1$ and controlling the gain of the variable gain amplifier circuit 12 such that the upper level is equal to the reference voltage $V_1$, numeral 15 denotes an amplitude discrimination (selector) circuit for slicing the binary signal using the reference voltage $V_2$ as a reference to reproduce the digital signal, and numeral 16 denotes an output terminal.

The basic operation is first explained. The television signal applied to the input terminal 11 with the binary signal being superimposed thereon is applied to the clamp circuit 13 through the amplifier 12. The clamp circuit 13, thus produces the binary signal having the lower level of the CRI signal clamped to the reference voltage $V_3$. On the other hand, the control circuit 14 detects the upper level of the CRI signal of the output signal from the clamp circuit 13, compares it with the reference voltage $V_1$ and controls the gain of the amplifier 12 such that it becomes equal to the reference voltage $V_1$. Since the lower level of the CRI signal is fixed by the clamp circuit 13, the upper level thereof is varied by changing the amplitude of the signal. Accordingly, by changing the gain of the amplifier 12, the upper level can be made equal to the reference voltage $V_1$.

The binary signal having its upper level clamped to the reference voltage $V_1$ and its lower level clamped to the reference voltage $V_3$ is then applied to the amplitude discrimination circuit 15 having the reference voltage $V_2$ as a reference. Since the reference voltages $V_1$, $V_2$ and $V_3$ meet the relationship as defined by the formula (1), the digital signal produced at the output terminal 16 is the signal which is sliced by a reference voltage which is the center voltage between the lower level and the upper level of the binary signal. Accordingly, even if the amplitude of the received binary signal varies, it can be correctly converted to the digital signal and the correct image can be reproduced.

It should be understood that a similar effect is obtained by clamping the upper level of the CRI signal of the binary signal to the reference voltage $V_1$ by the clamp circuit 13, comparing the lower level with the reference voltage $V_3$ and controlling the gain of the amplifier circuit 12 such that the lower level becomes equal to the reference voltage $V_3$.

The basic configuration described above can attain the primary object of the present invention, but if the portion of the binary signal other than the header includes only the high level or the low level, the basic configuration alone may sometimes result in unstable operation. In order to assure more stable operation, noting the fact that the CRI signal and the signal portion around the CRI signal repetitively change between the high level and the low level, at the period of the portion around the CRI signal one level of the binary signal is clamped to the reference voltage, and at the other period the clamped voltage is held for the level of the binary signal portions other than that around the CRI signal so that the one level of the binary signal is fixed for the other signal portions. Similarly, the other level of the binary signal portion around the CRI signal is detected, and compared with the corresponding reference voltage to detect a control voltage which controls the gain of the variable gain amplifier such that the other level becomes equal to the corresponding reference voltage. The detected control voltage is held for signal portions other than that around the CRI signal during which signal portions the other level of the binary signal is secured at the reference voltage.

FIG. 3 shows a specific circuit diagram which operates in accordance with the teaching described above. Numeral 20 denotes a power supply terminal; 21 an input terminal for the television signal on which the binary signal is superimposed; 22 a control pulse which assumes the high level only around the CRI signal; 23 a coupling capacitor; 24 and 25 biasing resistors; 26 a transistor; 27 an emitter resistor; 28 and 29 transistors; 30 a load resistor; 31 an emitter follower transistor; 32 a load resistor; 33 a clamp circuit capacitor; 34 a clamp circuit diode; 35 and 36 transistors which constitute an analog switch which conducts only when the control pulse applied to the input terminal 22 assumes the high level; 72 an emitter follower transistor; 73 a load resistor; 37 a resistor; 38 a diode for compensating for a forward voltage drop of the diode 34; 39 a transistor for compensating for a base-to-emitter voltage drop of the emitter follower transistor 72; 40 and 41 transistors which constitute the amplitude discrimination circuit; 42 a current source; 43 a load resistor; 44, 45, 46 and 47 resistors which constitute the reference voltage generating circuit for generating the three reference voltages $V_1$, $V_2$ and $V_3$; 48 and 49 transistors which constitute an analog switch which passes the input signal thereto only when the control pulse applied to the input terminal 22 assumes the high level, 50 a resistor; 51 and 52 transistors which constitute a voltage limiting circuit for eliminating voltage signals lower than the reference voltage $V_2$; 53 a resistor; 54 a clamping circuit capacitor; 55 a transistor for compensating for a voltage rise between the base and the emitter of the transistor 48; 56 a resistor; 57 a clamp circuit diode; 58 a rectifying diode; 59 a rectifying capacitor; 60 an emitter follower transistor; 61 a resistor; 62 a clamp circuit capacitor; 67 a clamp circuit diode; 68 a rectifying diode; 69 a rectifying capacitor; 70 an emitter follower transistor; 71 a resistor; 63 a transistor for compensating for a base-to-emitter voltage drop of the transistor 70; 64 a resistor; 65 and 66 diodes for compensating for forward voltage drops of the diodes 67 and 68; and 74 an output terminal.

The operation is now explained.

The reference voltage generating circuit comprising the resistors 44, 45 and 46 generates the three reference voltages. By selecting the resistances of the resistors 45 and 46 to be equal to each other, the three reference voltages $V_1$, $V_2$ and $V_3$ which meet the requirement of the formula (1) are generated.

The television signal applied to the input terminal 21 with the binary signal being superimposed thereon is applied to the clamp circuit including the capacitor 33 through the variable gain amplifier (to be described later) comprising the transistors 26, 28 and 29. The clamp circuit is added with the analog switch comprising the transistors 35 and 36 so that the clamping capacitor 33 is charged through the clamping diode 34 only during the on-period of the analog switch. In other words, the clamp circuit functions only during the on-period of the analog switch, and during the other periods the signal is held to the voltage charged in the capacitor 33. Thus, by designing the circuit such that the analog switch is turned on only around the CRI signal period with the input signal applied to the input terminal 21, the clamp circuit charges up the capacitor 33 such that it clamps the lower level of the binary signal portion around the CRI signal to the reference voltage, and during the off-period of the analog switch the clamp circuit holds the charged voltage. In this manner, the lower level of the binary signal is clamped to the reference voltage. More precisely, the voltage changed in the capacitor 33 is discharged through the transistor 72 but the amount of discharge is very small and the necessary holding period is only one horizontal period. Therefore, the amount of discharge may be neglected by properly selecting the capacitance of the capacitor 33. Since the voltage drops of the transistor 72 and the diode 34 are compensated for by the transistor 39 and the diode 38, the lower level of the binary signal applied to the base of the transistor 40 is equal to the voltage at the junction of the resistors 46 and 47 of the reference voltage generating circuit, that is, equal to the reference voltage $V_3$.

The binary signal having its lower level clamped to the reference voltage $V_3$ is applied to the analog switch comprising the transistors 48 and 49. The analog switch is designed to conduct only around the CRI signal period so that it supplies the signal to the voltage limiting circuit comprising the transistors 51 and 52 only around the CRI signal period. The voltage limiting circuit extracts only those signals which are higher than the reference level $V_2$. This output signal is applied to the clamp circuit comprising the capacitor 54 and the diode 57 and the peak detection circuit which is the rectifying circuit comprising the diode 58 and the capacitor 59 to detect the signal level higher than the reference voltage $V_2$, of the signal portion around the CRI signal. The signal appearing at the emitter of the transistor 60 is zero volt during the period other than neighbourhood of the CRI signal period and assumes a voltage level higher than the reference voltage $V_2$ only during the neighbourhood of the CRI signal period.

This signal is clamped to the reference voltage $V_2$ by the capacitor 62 and the diode 67 and then rectified by the diode 68 and the capacitor 69. The capacitor 69 has a capacitance large enough to hold the charged voltage for one horizontal period. Since the voltage drops of the diodes 67 and 68 and the transistor 70 are compensated for by the diodes 65, 66 and the transistor 63, the D.C. voltage which is equal to the upper level of the binary signal around the CRI signal period at the base of the transistor 40 is provided at the emitter of the transistor 70. This voltage is applied to the base of the transistor 28 of the differential amplifier having the reference voltage $V_1$ applied to the base of the other transistor 29. A closed loop is thus established. That is, the base voltage of the transistor 28, i.e. the upper level of the binary signal around the CRI signal period is compared with the reference voltage $V_1$ and if it is higher than the reference voltage $V_1$ the gain of the variable gain amplifier is lowered to lower the level to the reference voltage $V_1$ and if it is lower than the reference voltage $V_1$ the gain of the variable gain amplifier is raised to raise the level to the reference level $V_1$. By designing the constants of the components such that the above operation completes in the period around the CRI signal period, the gain of the variable gain amplifier is held at making the upper level of the output signal of the clamp circuit equal to $V_2$ during the period other than the CRI signal period by the voltage held in the capacitor 69.

By the operation described above, the upper level of the binary signal applied to the base of the transistor 40, around the CRI signal period, is clamped to the reference voltage $V_1$ and the lower level is clamped to the reference voltage $V_3$. During the period other than the CRI signal period, the voltage levels clamped during the CRI signal period are held so that the upper level and the lower level are clamped to the reference voltages $V_1$ and $V_3$, respectively.

The binary signal having its upper level and lower level always clamped to the reference voltages $V_1$ and $V_3$, respectively, is then applied to the amplitude discrimination circuit comprising the transistors 40 and 41. Since the reference voltage $V_2$ is applied to the base of the transistor 41, the voltage discrimination is effected with reference to the reference voltage $V_2$ so that the correctly digital-converted binary signal is produced at the output terminal 74. The output signal is then level-shifted and supplied to a digital circuit for the reproduction of the characters and the graphic pattern.

As described hereinabove, according to the present invention, the upper level and the lower level of the binary signal supplied to the amplitude discrimination circuit can be always clamped to the predetermined reference voltages so that the correct amplitude discrimination is effected and the binary signal is correctly reproduced.

While the present invention has been shown and described in conjunction with the application to the Japanese Teletext System, the present invention is equally applicable to other television multiplexing systems, e.g. the CEEFAX/ORACLE system and the ANTIOPE system which includes the control signal similar to the header shown in FIG. 1B at the beginning of the multiplexed binary signal, and the pilot signal or the framing signal similar to the CRI signal.

It should be understood that a similar effect as that obtained in the Japanese Teletext System will be attained when the present invention is applied to the CEEFAX/ORACLE system or the ANTIOPE system character multiplexed receiver.

What is claimed is:

1. A multiplexed television signal processing system comprising:

a receiving circuit for receiving a binary signal transmitted in superposition on a television signal;

a reference voltage generating circuit for generating a first reference voltage, a second reference voltage higher than said first reference voltage and a third reference voltage lower than said first reference voltage by a difference between said first reference voltage and said second reference voltage;

a variable gain amplifier circuit adapted to receive said television signal having the binary signal superimposed thereon;

a clamp circuit for clamping and holding a lower (or upper) level of a pilot signal in said binary signal to said third (or second) reference voltage during a period around the pilot signal period;

a control circuit for detecting the upper (or lower) level of said pilot signal during the period around the pilot signal period, comparing the detected level with said second (or third) reference voltage and controlling the gain of said variable gain amplifier such that said detected level becomes equal to said second (or third) reference voltage; and an amplitude discrimination circuit for amplitude-discriminating said binary signal using said first reference voltage as a discrimination reference.

2. A multiplexed television signal processing system according to claim 1 wherein said first, second and third reference voltages are generated by series-connected voltage dividing resistors.

3. A multiplexed television signal processing system according to claim 1 wherein said input binary signal is applied to said variable gain amplifier circuit, the output of said variable gain amplifier circuit is applied to said clamp circuit, and the output of said clamp circuit is applied to said amplitude discrimination circuit.

4. A multiplexed television signal processing system according to claim 1 wherein said variable gain amplifier circuit includes a differential amplifier having a base of one transistor thereof connected to receive said second reference voltage and a base of other transistor thereof connected to receive said detected upper or lower level around said pilot signal.

5. A multiplexed television signal processing system according to claim 1 wherein an output signal portion from said clamp circuit which is higher than a predetermined level is extracted only during period around the pilot signal period, the extracted signal is detected by a detection circuit of a small time constant, and the detected output is rectified by a rectifying circuit of a large time constant to detect the upper or lower level around the pilot signal period.

* * * * *